US012764100B2

(12) United States Patent
Park et al.

(10) Patent No.: US 12,764,100 B2
(45) Date of Patent: Oct. 13, 2026

(54) METHOD, SERVER AND USER TERMINALS FOR GROUPING AND MANAGING MESSENGER SERVICE USERS

(71) Applicant: KAKAO CORP., Jeju-si (KR)

(72) Inventors: Se In Park, Seongnam-si (KR); Min Joung Choi, Seongnam-si (KR); Su Ok Song, Seongnam-si (KR)

(73) Assignee: KAKAO CORP., Jeju-si (KR)

(*) Notice: Subject to any disclaimer, the term of this patent is extended or adjusted under 35 U.S.C. 154(b) by 289 days.

(21) Appl. No.: 18/175,595

(22) Filed: Feb. 28, 2023

(65) Prior Publication Data

US 2023/0275881 A1 Aug. 31, 2023

(30) Foreign Application Priority Data

Feb. 28, 2022 (KR) ........................ 10-2022-0026419

(51) Int. Cl.
*H04L 9/40* (2022.01)

(52) U.S. Cl.
CPC .......... *H04L 63/065* (2013.01); *H04L 63/083* (2013.01); *H04L 63/104* (2013.01)

(58) Field of Classification Search
CPC ... H04L 63/065; H04L 63/083; H04L 63/104; H04L 51/04; H04L 51/52; G06Q 50/50; G06Q 50/01; G06F 21/31
See application file for complete search history.

(56) References Cited

U.S. PATENT DOCUMENTS

2011/0191417 A1* 8/2011 Rathod .................. G06Q 30/02 709/204
2013/0024516 A1* 1/2013 Blinder .................. G06Q 50/01 709/204
2013/0254397 A1* 9/2013 Lai ......................... G06Q 50/01 709/225
2014/0236953 A1* 8/2014 Rapaport .............. G06F 16/285 707/740
2015/0172227 A1* 6/2015 Grove ................. H04L 12/1813 709/206
2015/0350221 A1* 12/2015 Espinosa ............. G06F 21/6245 726/4
2016/0036588 A1* 2/2016 Thackston .......... H04L 63/0838 713/168

FOREIGN PATENT DOCUMENTS

KR 2012-0137632 A 12/2012
KR 10-1568311 B1 11/2015
KR 2017-0035657 A 3/2017

* cited by examiner

*Primary Examiner* — Joe Chacko
(74) *Attorney, Agent, or Firm* — NKL LAW; Jae Youn Kim

(57) ABSTRACT

Disclosed is there is provided a method for grouping and managing messenger service users, and the method includes: receiving a request to create a group from a first user; determining whether the first user is eligible to create the group; receiving a request from the first user to invite a second user to the group, wherein the second user corresponds to a friend of the first user in a messenger service operated by the server; sending an invitation message to invite the second user to the group through the messenger service; receiving a response indicating acceptance of the invitation from the second user; determining whether the second user is eligible to join the group; and managing the first user and the second user in the group.

16 Claims, 18 Drawing Sheets

FIG. 5C
Family Account
530
Consent to information inquiry between family members
In order to use the service, Kakao account profile information (photo, nickname), real name, and service information being used by the family account between family members may be checked
After consent, authentication will be performed through Kakao certificate
Cancel
Confirm
Start family account

FIG. 6B
Guide for UsingAccount Profile
Cheolsoo Dad (Kim Gapdong) proceeds with invitation of family member.
If invited, the family member can see the above Kakao account profile information (nickname, photo) and real name.
Change Account Profile
Next

FIG. 7B
Invitation Information
720
[Cheolsoo Dad] has invited
you to family account.
The above family representative can change
guardian consent and family account settings.
This invitation expires on December 10, 2021
730
Decline Invitation
Accept Invitation

FIG. 8B
Guardian Consent Request
Guardian consent is being requested.
A request for guardian consent has been sent to the family representative's KakaoTalk account. After the guardian completes authentication, it will proceed to the next step.
Remaining Valid Time: 01:23
820
Confirm
Request in another way

FIG. 8C
Kakao Talk
830
Kakao Talk
Certification Request Guide
You have received a verification request.
-Type of request: Identity authentication for guardian consent
-Requester: Kim Cheolsoo
-Recipient: Kim Gapdong
-Effective date: January 22, 2021 15:30
831
Authenticate

METHOD, SERVER AND USER TERMINALS FOR GROUPING AND MANAGING MESSENGER SERVICE USERS

BACKGROUND OF THE DISCLOSURE

Field of Disclosure

The present disclosure relates to a method, server, and user terminal for grouping and managing a plurality of users in a messenger service that provides a conversation function through instant messages.

Related Art

With the widespread use of smartphones, tablet computers, and smart wearable devices, messenger services that provide conversation functions with other parties via instant messages such as text, images, or voice are becoming widespread. Accordingly, communication between users, which has been performed in the past by voice calls, short message services (SMS), and the like, has been replaced by messenger services in a large part.

Such messenger services are providing a variety of additional functionality, as well as supporting simple interaction between two users. For example, such messenger services support interaction among three or more users, support message delivery of authorities, banks, online shopping malls, and the like, and support the function to authenticate personal information, such as the user's real name, filing date, etc.

These messenger services provide a function for users to connect to each other via a friend relationship. The messenger service provides other users, who are friended to the user, in a friend list. In addition, the messenger service may allow the user to provide with a friend with a service (e.g., sending a gift, sending remittance, etc.) that is not provided to the other party who is in a non-friend relationship with the user.

With the expansion and spread of these functions of messenger services, there has been an increasing demand for grouping and managing messenger users according to a predetermined criterion.

RELATED DOCUMENT

Patent Document (Patent Document 1) Korea Patent No. 10-1568311 (Nov. 5, 2015)

SUMMARY OF THE DISCLOSURE

The present disclosure is to provide a method for grouping and managing messenger service users according to predetermined criterion and procedure.

Further, the present disclosure is to improve user convenience by using messages of a messenger service in grouping and managing messenger service users.

Further, the present disclosure is to improve convenience of requesting and performing guardian consent between users by grouping and managing messenger service users.

In an aspect of the present disclosure, there is provided a method for grouping and managing messenger service users, and the method includes: receiving a request to create a group from a first user; determining whether the first user is eligible to create the group; receiving a request from the first user to invite a second user to the group, wherein the second user corresponds to a friend of the first user in a messenger service operated by the server; sending an invitation message to invite the second user to the group through the messenger service; receiving a response indicating acceptance of the invitation from the second user; determining whether the second user is eligible to join the group; and managing the first user and the second user in the group.

According to an embodiment of the present disclosure, the eligibility to create the group may be that the first user completes authentication through an authentication method for authenticating a year of birth of the first user.

According to an embodiment of the present disclosure, the eligibility to create the group may be that the year of birth of the first user is earlier than a predetermined criterion.

According to an embodiment of the present disclosure, the eligibility to join the group may be that the second user has completed authentication through an authentication method for confirming a year of birth of the second user.

According to an embodiment of the present disclosure, the eligibility to join the group may be that a difference between the years of birth of the first user and the second user exceeds a predetermined criterion.

According to an embodiment of the present disclosure, the method may further include: receiving, by the server, from the second user, request information requesting guardian consent from the first user; and transmitting, by the server, a request message requesting the guardian consent to the first user through the messenger service.

According to an embodiment of the present disclosure, the receiving of the request information and the transmitting of the request message may be performed after the managing of the first user and the second user in the group.

According to an embodiment of the present disclosure, the guardian consent may be required for the second user to obtain the eligibility to join the group, and the receiving of the request information and the transmitting of the request message may be performed between the sending of the invitation message and the managing of the first user and the second user in the group.

According to an embodiment of the present disclosure, the method may further include: receiving, by the server, from the second user, information requesting guardian consent to at least one user selected by the second user from among users managed in the group; and transmitting, by the server, a request message to request the guardian consent to the at least one user through the messenger service.

According to an embodiment of the present disclosure, the method may further include: receiving, by the server, information on designation of the second user as a representative of the group from the first user; determining, by the server, whether the second user is eligible to create the group; and designating, by the server, the second user as the representative of the group.

According to an embodiment of the present disclosure, the method may further include: selecting, by the server, from among friends of the first user in the messenger service, a candidate friend to be invited to the group according to a predetermined criterion, and providing the selected candidate friend.

According to an embodiment of the present disclosure, the predetermined criterion may be based on a profile name of a friend of the first user or content of a conversation with the friend of the first user in the messenger service.

According to an embodiment of the present disclosure, the invitation message may include an interface for accepting the invitation.

According to an embodiment of the present disclosure, the method may further include: providing the second user with an interface capable of obtaining the subscription credential when it is determined that the first user is not eligible to join the group.

In another aspect of the present disclosure, there is provided a server for grouping and managing messenger service users, and the server includes: a memory; and a processor connected to the memory and configured to execute instructions stored in the memory. The processor is further configured to: receive a request to create a group from a first user; determine whether the first user is eligible to create the group; receive a request from the first user to invite a second user to the group, wherein the second user corresponds to a friend of the first user in a messenger service operated by the processor; send, through the messenger service, an invitation message to invite the second user to the group; receive, from the second user, a response indicating that the invitation is accepted; determine whether the second user is eligible to join the group; and manage the first user and the second user in the group.

In yet another aspect of the present disclosure, there is provided a method for a user terminal to group and manage users of a messenger service, and the method include: receiving an interaction requesting creation of a group; displaying an interface for performing authentication to confirm a user's year of birth; displaying candidate friends allowed for the user to invite to the group, wherein the candidate friends are at least a part of friends of the messenger service to which the user has joined; and receiving an interaction for selecting a friend to be invited to the group from among the candidate friends.

According to an embodiment of the present disclosure, the method may further include: displaying, by the user terminal, a message requesting guardian consent to the user via the messenger service and an interface through which the user is able to perform the guardian consent, wherein the message comprises content that the friend managed in the group requests the user to consent to consent as a guardian of the friend.

According to an embodiment of the present disclosure, the method may further include: displaying, by the user terminal, a subject of the guardian consent; and displaying, by the user terminal, an interface for performing authentication for the guardian consent.

In yet another aspect of the present disclosure, there is provided a user terminal for grouping and managing users of a messenger service, and the user terminal includes; a memory and a processor connected to the memory and configured to execute instructions stored in the memory. The processor is further configured to: display an interface for performing authentication to confirm a birth age of a user; display candidate friends allowed for the user to invite to the group, wherein the candidate friends are at least a part of friends of the messenger service to which the user has joined; receive an interaction of selecting a friend to be invited to the group from among the candidate friends; and display, through the messenger service, a message that the selected friend accepts the invitation.

DESCRIPTION OF EXEMPLARY EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In addition, in the following description of the embodiments, a detailed description of known functions and configurations incorporated herein will be omitted when it may impede the understanding of the embodiments.

While terms including ordinal numbers, such as "first" and "second," etc. may be used to describe various components, such components are not limited by the above terms. The above terms are used only to distinguish one component from another.

The singular forms are intended to include the plural forms as well, unless the context clearly indicates otherwise.

In this specification, respective steps described may be performed regardless of a listed order, except for a case where it must be performed in the listed order due to a special causal relationship.

Terms such as "include" or "have" are used herein and should be understood that they are intended to indicate an existence of several components, functions or steps, disclosed in the specification, and it is also understood that greater or fewer components, functions, or steps may likewise be utilized.

Hereinafter, the present disclosure will be described with reference to the accompanying drawings.

Figure 1:
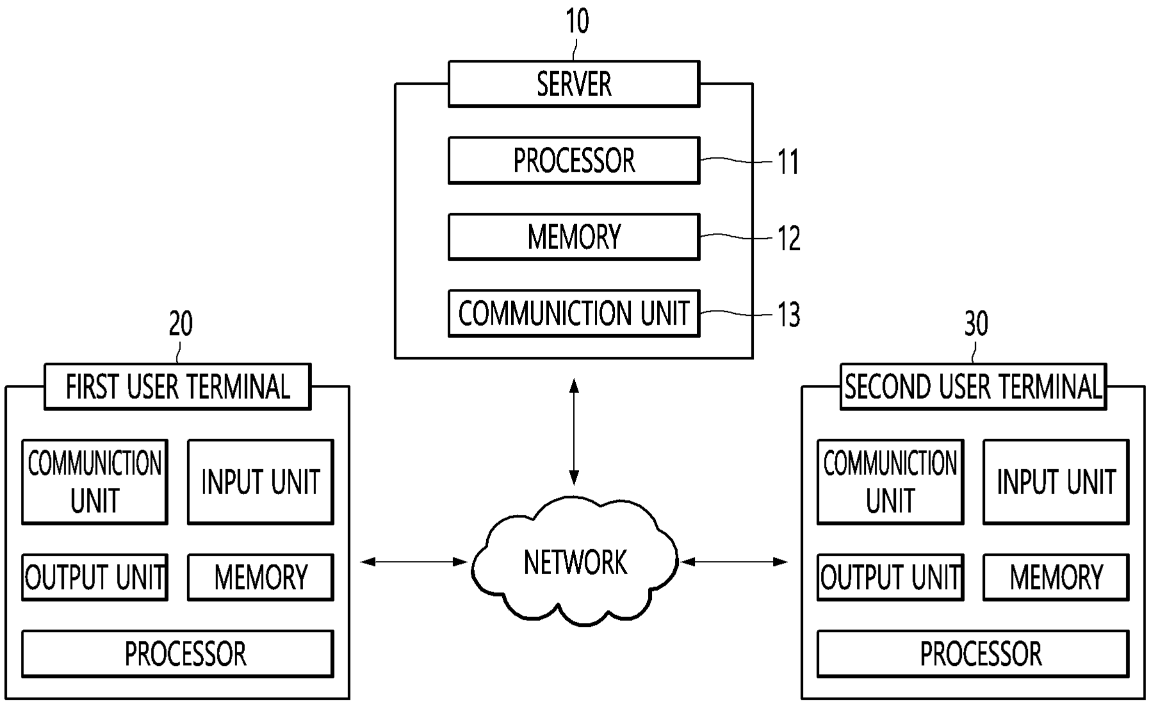
FIG. 1 is a diagram illustrating an example of a network environment according to an embodiment of the present disclosure.

FIG. 1 is a diagram illustrating an example of a network environment according to an embodiment of the present disclosure.

A network environment according to an embodiment of the present disclosure shown in FIG. 1 may include a server 10 and a user terminal. The user terminal may include a first user terminal 20 and a second user terminal 30.

The network is not limited in a communication method, and may include not only a communication method utilizing a communication network (e.g., a mobile communication network, wired Internet, wireless Internet, and broadcasting network) that the network may include, but also short-range wireless communication.

The server 10 may be implemented as a computer device or a plurality of computer devices that provide commands, codes, files, contents, services, and the like. The server 10 may be a server capable of transmitting and receiving information by communicating with a user terminal through a network.

The server 10 may include a processor 11, a memory 12 and a communication part 13.

The processor 11 may provide a messenger service to a user terminal by controlling overall operations of the memory 12 and the communication part 13. The messenger service provides a conversation (chat) function through instant messages between user terminals.

The memory 12 serves as a storage medium and may store a plurality of application programs running in the server 10, and data and instructions for operating the server 10. As an example, an application related to a messenger service may be stored in the memory 12.

The memory 12 may be provided in the form of any of various hardware storage devices such as a read only memory (ROM), a random access memory (RAM), a flash drive, hard drive, etc., or may be provided in the form of a web storage.

The communication part 13 may communicate with a user terminal via a network by wire or wirelessly.

The server 10 of the present disclosure may provide a messenger service for user terminals. Specifically, the server 10 provides a message chat room (chat room) as a messenger service, and users can exchange messages with each other in the message chat room. Here, the message includes a text, an image, a video, a voice, a file, contact information, location information, and voting information of participants.

In this messenger service, users may be connected to each other through a relationship called friends. In the messenger service, a friend relationship may be formed by a friend request and an acceptance request between two users or by satisfying a requirement where at least one of the two users has a phone number of the other party in his/her phone. In some cases, the messenger service may provide a service to a non-friend user as a counterpart. However, such cases may be limited, compared to a type of service in which a user in a friend relationship is a counterpart.

The server 10 may group and manage users of the messenger service. Specifically, grouping and managing users means that the server 10 manages two or more user accounts by assigning the same group code according to a predetermined criterion. Groups may be created according to various criteria. For example, the groups may include a family account group, an office account group, and an alumni account group.

Here, the family account group refers to a group including two or more users having a family relationship with each other. The family relationships may be determined by various criteria, such as lineal ascendants, direct descendants, collateral blood relatives, affinity relatives within the fourth degree of relationship, and affinity relatives within the six degree of relationship. In some cases, there may be cases where it is impossible for the server 10 to verify a legal family relationship between users. When it is impossible for the server 10 to verify the legal family relationship between users, the server 10 may manage the users by grouping the users into a family group in consideration of the relationship between a creator or representative of the group and other members of the group. In addition, the server 10 may group and manage users into a family group by invitation and acceptance between users. In addition, in some cases, when the server 10 is able to verify a user's year of birth (age), the server 10 may manage users by grouping the users into a family group based on the users' years of birth (age).

The server 10 may first receive a request for creating a group from a first user. The server 10 may create the group by determining whether the first user is eligible to create a group. Here, the eligibility to create a group may be determined by verifying a year of birth of the first user. The server 10 may receive, from the first user, a request to invite a second user to a group. Here, the second user may correspond to a friend of the first user in the messenger service. Thereafter, the server 10 may transmit an invitation message to invite the second user to the group through the messenger service. When receiving from the second user a response indicating that the invitation is accepted, the server 10 may determine whether the second user is eligible to join the group. Here, the eligibility to join the group may be certifying a year of birth of the second user. In this case, the server 10 may provide the second user with an interface for obtaining the eligibility to join the group. When it is determined that the second user is eligible to join the group, the server 10 may manage the first user and the second user in a group.

The user terminal may include a first user terminal 20 and a second user terminal 30. The user terminal may be a fixed terminal implemented as a computer device or a mobile terminal. For example, the user terminal may include a smart phone, a mobile phone, a tablet PC, a computer, a laptop computer, and personal digital assistants (PDAs). For example, the user terminal may communicate with the server 10 or other user terminals via a network by wire or wirelessly.

The user terminal may be used by a user. A user may refer to a user of a user terminal or an account registered as a user in a messenger service provided by the server 10. Therefore, the fact that the server 10 transmits certain information to a user may mean that the information is transmitted to the user's user terminal through the user's account registered in the server 10.

A user terminal may include a communication part, an input part, an output part, a memory, and a processor.

The communication part may communicate with the server 10 or other terminals by wire or wirelessly.

The input part may receive various types of information through a user's manipulation and input behavior. The input part may be a touch screen module, a keyboard, a mouse, a button, a camera, a stylus, a microphone, and the like.

The user terminal may receive a user interaction through the input part. The interaction refers to a user's manipulating the input part to input information reflecting the user's selection or intention to a user terminal. For example, the interaction may be touching of a touch screen, clicking of a mouse, typing of a keyboard, sound input to a microphone, image capture by a camera, motion recognition by a motion sensor, and the like.

The output part may output various types of information. The output part may be a display device, a speaker, a vibration device, a tactile device, and the like. In some cases, the output part may be a device (e.g., Bluetooth earphone) that is connected to the user terminal through wired or wireless communication (e.g., short-range wireless communication such as Bluetooth) to receive and output signals.

The memory serves as a storage medium, and may store a plurality of application programs running in the user terminal, and data and instructions for operating the user terminal. The memory may be provided in the form of any of various storage devices such as a read only memory (ROM), a random access memory (RAM), a flash drive, hard drive, etc., or may be provided in the form of a web storage.

In one embodiment, an application related to a messenger service and proceeding with authentication may be stored in the memory.

The processor may execute a messenger service and an application related to verification by controlling the overall operation of the communication part, the input part, the output part, and the memory.

Hereinafter, for convenience of description, the user of the first user terminal 20 will be referred to as a first user and the user of the second user terminal 30 will be referred to as a second user.

The first user of the first user terminal 20 may be a user of a messenger service. The first user terminal 20 may request creation of a group in the messenger service, perform authentication to confirm the year of birth of the first user, and display an interface for selecting friends to invite to the group.

In addition, the first user terminal 20 may display a message indicating that a friend has accepted the invitation through the messenger service, a message requesting guardian consent, and the like. The first user terminal 20 may display an interface for performing authentication for guardian consent in response to the message requesting guardian consent.

The second user of the second user terminal 30 may be a user of a messenger service. The second user terminal 30 may display an invitation message in the messenger service. In addition, an interface for performing authentication to confirm the year of birth of the second user, accepting the invitation, and requesting guardian consent from the first user may be displayed.

Figure 2:
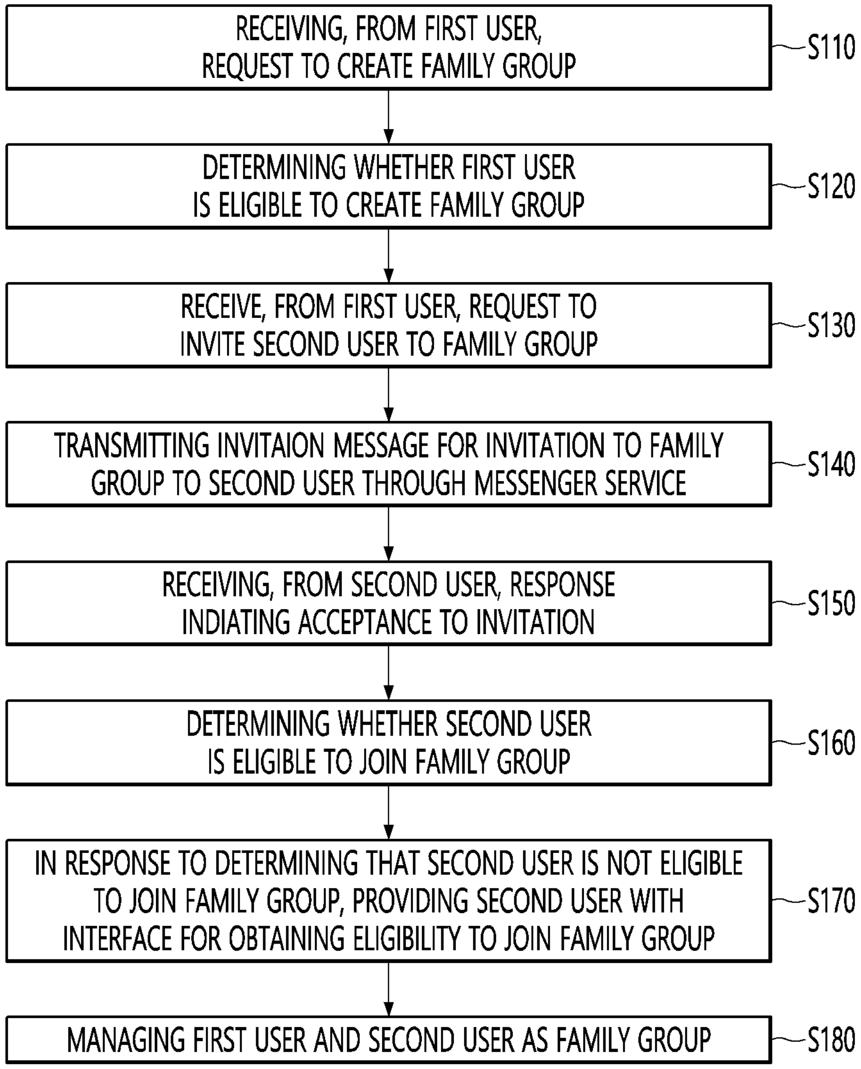
FIGS. 2 to 4 are flowcharts illustrating a method for a server to group and manage messenger service users according to an embodiment of the present disclosure.

Hereinafter, with reference to FIG. 2, a method in which a server according to the present disclosure manages messenger service users in a group will be described.

In operation S110, a server 10 receives a request for creating a group from a first user. This request may be received through a messenger service application of a first user terminal 20.

After operation S110, when the server 10 creates a group for the first user, the server 10 may give a notice that the first user's information (photo, profile name, nickname, real name, other services being used based on the group) can be provided to other users. Specifically, the information on the first user may be provided to other users whom the first user invites to the group or to other users who are managed together with the first user in the group.

In operation S120, the server 10 determines whether the first user is eligible to create a group. Here, the eligibility to create a group may be determined by the server 10 according to various criteria. For example, the eligibility to create a group may be that the first user has a certificate for a predetermined authentication method. In order to check the first user's eligibility to create a group, the server 10 may request authentication according to the predetermined authentication method from the first user.

In some cases, another eligibility to create a group may be that the first user satisfies a predetermined year of birth (age) requirement. The server 10 may confirm the year of birth of the first user in the process of performing authentication of the first user.

The above-described authentication may be completed when a separate authentication server different from the server 10 issues a certificate to the first user and the first user performs authentication (entering password, authenticating biometric data, etc.). The authentication server may be a separate server that is different from the server 10 operating the messenger service but has a cooperative relationship with the server 10 in some cases. In some cases, it is also possible for the server 10 to issue a certificate to the first user and proceed with authentication.

In some cases, the above-described authentication may be identity authentication, real-name authentication, credit card authentication, common authentication, and the like.

If, in operation S120, the server 10 determines that the first user has not obtained the eligibility to create a group, the server 10 may provide the first user with an interface for obtaining the eligibility to create a group. This may be, for example, providing an interface through which the first user can be issued with a certificate through the authentication server described above.

The eligibility to create a group may include completing the above authentication, and may further include that the year of birth confirmed through the authentication is earlier than a predetermined criterion. That is, a requirement where the first user must be over a predetermined age to create a group may be added. For example, the server 10 may add in a group-creating requirement that a creator creating a group must be 19 years or older, and in operation S120, the server 10 may determine whether or not the first user satisfies a group-creating requirement that a year of birth must be earlier than a predetermined criterion. When the first user fails to satisfy the requirement that a year of birth must be earlier than the predetermined criterion, the server 10 may transmit information such as a requirement unsatisfactory code to the first user terminal 20, and the first user terminal 20 may display a pop-up window including information such as group creation impossibility and a reason for the impossibility. In doing so, the server 10 may inform the first user of the reason why the requirement is not satisfied, and may reject the creation of the group.

A creator of a group may be a representative of the group. The creator of the group may make a decision on behalf of members of the group or may make guardian consent as a guardian of other members. Therefore, by adding an appropriate year of birth (age) requirement for creating a group, the server 10 may determine whether the first user has an appropriate right to make a decision on behalf of members in the group as a family representative or to make guardian consent as a guardian of other members.

In operation S130, the server 10 may receive a request from the first user to invite the second user to the group. The second user may have a friend relationship with the first user in the messenger service. Specifically, the first user may select the second user from among users who are in a friend relationship with the first user in the messenger service.

In operation S140, the server 10 may transmit an invitation message to invite the second user to the group. Here, the invitation message may be transmitted through the messenger service. The invitation message may include an interface through which the second user can accept the invitation.

In operation S140, when the second user is invited to the group, the server 10 may give a notice to the second user that the second user's information (photo, profile name, nickname, real name, other services being used based on the group) can be provided to other users. Specifically, information on the second user may be provided to a counterpart (first user) who invited the second user to the group or other users who are managed together in the group.

In operation S150, the server 10 may receive a response indicating acceptance of the invitation from the second user. Specifically, when the second user enters an interaction on the interface for accepting the invitation included in the invitation message in operation S140, the server 10 may receive a response indicating the second user's accepting the invitation.

In operation S160, the server 10 may determine whether or not the second user is eligible to join the group. Here, the eligibility to join a group may be determined by the server according to various criteria. For example, the eligibility to join a group may be that the second user has a certificate for a predetermined authentication method. The server 10 may request authentication according to a predetermined authentication method to the second user in order to verify the eligibility to join a group. The server 10 may check the year of birth of the first user in the process of performing authentication of the second user. Here, the authentication method may be the same as or different from the authentication method described in operation S120.

Even in a case where the second user has no certificate for the above-described predetermined authentication method, if the server 10 is able to confirm the year of birth of the second user by another predetermined method, it may be determined that the second user is eligible to create a group. For example, if the server 10 is able to confirm the year of birth of the second user through another authentication method such as identity authentication and real name authentication, it may be determined that the second user is eligible to create a group.

The eligibility to join a group may further include that the year of birth confirmed through authentication must satisfy a predetermined criterion in addition to completing the above-described authentication. Here, the predetermined criterion may vary depending on the year of birth (age) of the second user. For example, if the second user is at the age of 14 or older, the second user may be entitled to join the group regardless of the difference in year of birth (age) from the first user. However, if the age of the second user is less than 14 years old, the second user may be entitled to join the group only when the difference in year of birth (age) between the first user. This is because the first user may perform consent as a guardian of the second user if the second user is under the age of 14, and to this end, it is required that the difference in year of birth (age) between the first user and the second user exceeds a predetermined criterion.

When the server 10 determines that the second user is not eligible to join the group in operation S160, the server 10 provides the second user with an interface for obtaining the eligibility to join the group in operation S170. This may be, for example, providing an interface through which the second user can complete authentication through the above-described authentication method.

In operation S180, the server 10 manages the first user and the second user in a group when it is determined that the second user is eligible to join the group in operation S160. When the second user and the first user are managed in a group, the server 10 may provide information indicating that the second user has joined the group to the first user through a messenger service message. In addition, the server 10 may provide information on member status of a group including the first user and the second user to the first user and the second user through a messenger service application.

Hereinafter, with reference to FIG. 3, an additional embodiment in which a server according to the present disclosure manages messenger service users in a group will be described.

Figure 3:
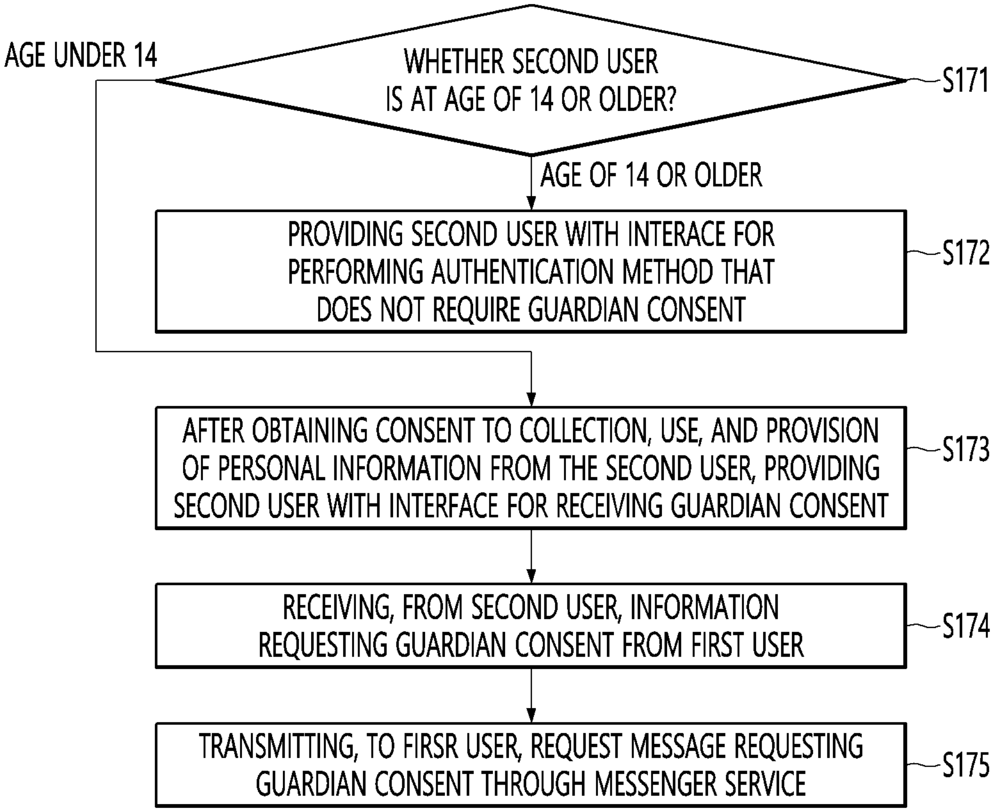

In performing the above-described operation S170, the server 10 may provide a differentiated authentication method as shown in FIG. 3 according to a year of birth (age) of the second user.

Specifically, the server 10 may provide a differentiated authentication method based on whether separate guardian consent is required when the second user collects, uses, and provides his or her personal information. Under the current regulations, if the second user is under the age of 14, separate guardian consent is required to process his or her personal information. Thus, in this specification, it will be described that a criterion for distinguishing the authentication methods is whether the second user is under the age of 14.

In operation S171, the server 10 may provide an interface through which the second user can select a different authentication method depending on the second user's year of birth (age).

When the second user is at the age of 14 years or older in operation S171, the server 10 provides an interface for performing an authentication method requiring no guardian consent in operation S172. The authentication method herein may be, for example, a method in which a separate authentication server, distinguished from the server 10, issues a certificate to the second user, and the second user performs and completes authentication.

When the second user is under the age of 14 in operation S171, the server 10 provides, after obtaining the second user's consent to the collection, use, and provision of personal information, an interface for obtaining guardian consent in operation S173. Here, in operation S174, the second user may designate the first user and request guardian consent from the first user.

In the general guardian consent process, if the second user is under the age of 14, guardian consent may be performed by one of the legal representatives of the second user. In some cases, there may be a plurality of legal representatives of the second user, and the second user may select one of the plurality of legal representatives and request guardian consent from the selected one. Thereafter, the selected guardian must input his or her personal information (name, resident registration number, mobile phone number) into the second user terminal 30 to perform authentication.

However, in the present disclosure, guardian consent may be requested with the first user being designated as a guardian of the second user, the first user who has invited the second user. This is because considering that the first user has invited the second user to the group, the first user may be regarded as a guardian if the second user is under the age of 14.

In operation S174, the server 10 receives, from the second user, request information requesting guardian consent from the first user. Here, the guardian consent is consent by the first user as a guardian of the second user.

In operation S175, the server 10 transmits a request message requesting the guardian consent to the first user through the messenger service. Here, the request message may include an interface for performing guardian consent. The first user receives a request message through the messenger service through which first user has invited the second user to the group, and a simple procedure may be achieved because the first user can immediately perform guardian consent using the interface included in the request message received. In particular, since the first user is automatically designated as a guardian of the second user, it is not necessary to separately enter the first user's personal information (name, resident registration number, mobile phone number) during a guardian consent process. In addition, since the guardian needs to operate only a terminal of the guardian instead of the second user terminal 30 in the above-described general guardian consent process, consent may be easily performed.

As described above, authentication may be completed after any of operations S172 and S175 according to the year of birth (age) of the second user. Thereafter, the server 10 manages the first user and the second user in a group in operation S180.

Hereinafter, with reference to FIGS. 4 to 9B, a screen in which the present disclosure is performed in a user terminal will be described as an example. For convenience of explanation, FIGS. 4 to 9B will be described with an example in which a group of the present disclosure is a family account group.

First, with reference to FIG. 4, another additional embodiment in which a server of the present disclosure manages messenger service users in a group will be described.

Figure 4:
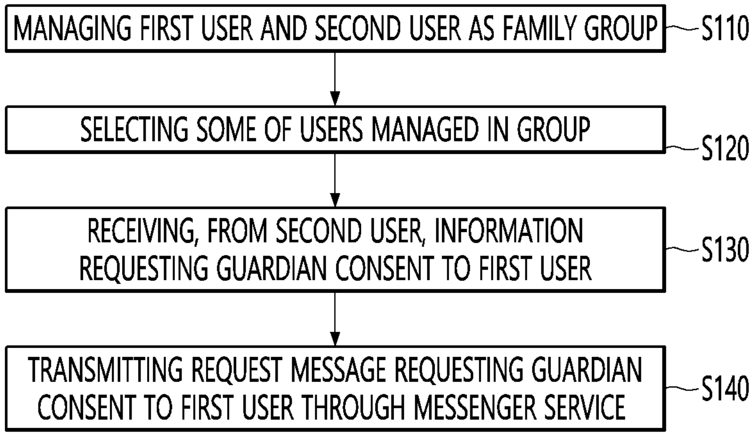

After performing the above-described operation S180, the server 10 requests guardian consent as shown in FIG. 4 according to the year of birth (age) of the second user and provides a function of performing the guardian consent.

Specifically, in operation S190, the server 10 provides an interface through which the second user can select some of the users managed in a group in the messenger service and requests consent from the selected users.

In operation S190, a user to whom the second user can request guardian consent may be a user who is eligible for guardianship of the second user among the users managed in the same group in the messenger service. There may be a plurality of users with guardianship of the second user among users managed in the same group, and in this case, the second user may select one of the plurality of users and request guardian consent from the selected one. However, in some cases, even when there is a plurality of users with guardianship of the second user, only a family representative may be requested for guardian consent. Whether or not the second user is with guardianship (as legal representative) may be limited according to a difference in year of birth (age) from the second user. For convenience of description, an example in which the second user selects the first user as a guardian and requests the guardian consent from the first user will be described.

In operation S200, the server 10 receives, from the second user, request information requesting guardian consent from the first user. In operation S210, the server 10 transmits a request message requesting the guardian consent to the first user through the messenger service. Since operations S200 and S210 are similar to operations S174 and S175 described above, detailed descriptions thereof will be herein omitted.

Here, the request message may include an interface for performing guardian consent. The first user receives the request message through the messenger service through which the first user has invited the second user to the group, and a simple procedure may be achieved since the guardian consent can be performed immediately using the interface included in the request message. In particular, since the first user is automatically designated as a guardian of the second user, it is not necessary to separately enter the first user's personal information (name, resident registration number, mobile phone number) during a guardian consent process. In addition, since the guardian needs to operate only a terminal of the guardian instead of the second user terminal 30 in the above-described general guardian consent process, consent may be easily performed.

Hereinafter, exemplary screens of a user terminal on which a method for managing users of a messenger service in a group according to the present disclosure is performed will be described with reference to FIGS. 5A to 9B.

Figure 5A:
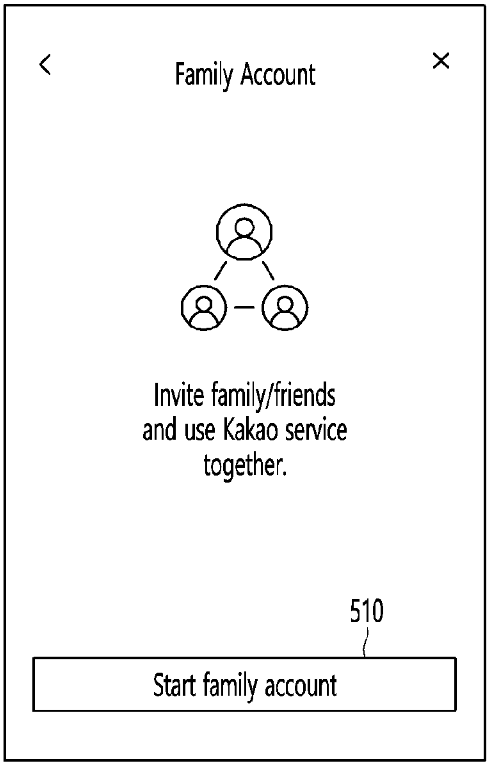
FIGS. 5A to 9B are exemplary screens of a user terminal on which a method for grouping and managing messenger service users according to an embodiment of the present disclosure is performed.
Figure 5B:
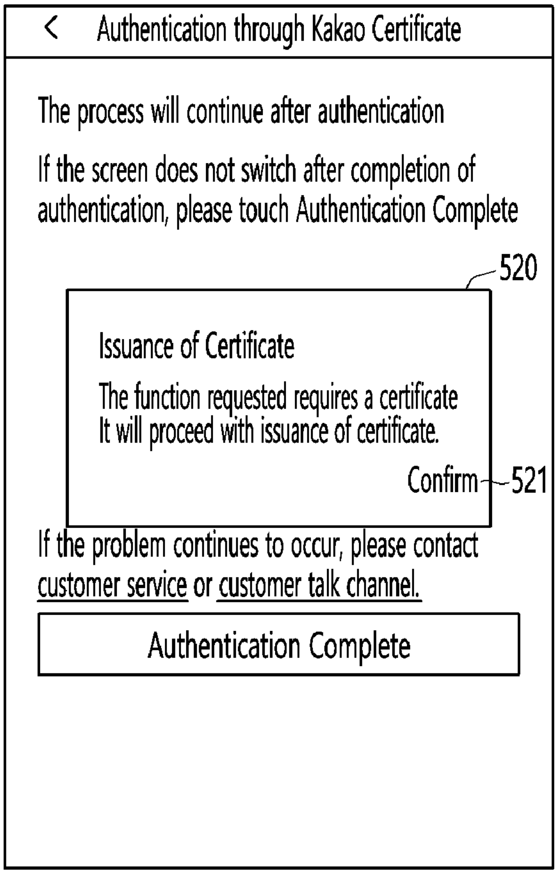
Figure 5C:

FIGS. 5A-5C illustrates an exemplary screen of the first user terminal 20 in the process of performing operations S110 and S120.

As shown in FIG. 5A, the first user terminal 20 may display an interface 510 requesting to create a group. The first user may request creation of a group from the server 10 by inputting an interaction on the interface 510.

As shown in FIG. 5B, information 520 guiding issuance of a certificate, which is the eligibility to create a group, may be displayed on the first user terminal 20. If the first user does not have a certificate, it may move to a certificate issuance page through the interface 521 included in the information 520.

As shown in FIG. 5C, when a group is created for the first user, information 530 guiding that the first user's information (photo, profile name, nickname, real name, other services being used based on group) can be provided to other users may be displayed on the first user terminal 20.

Figure 6A:
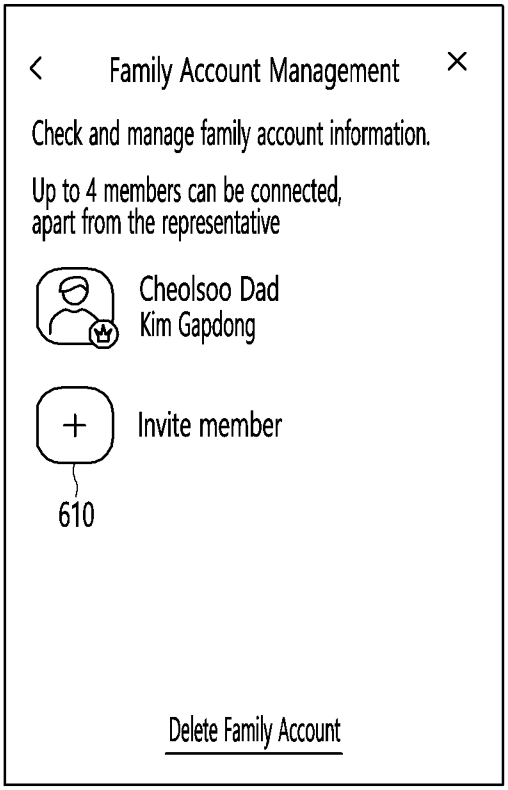
Figure 6B:
Figure 6C:
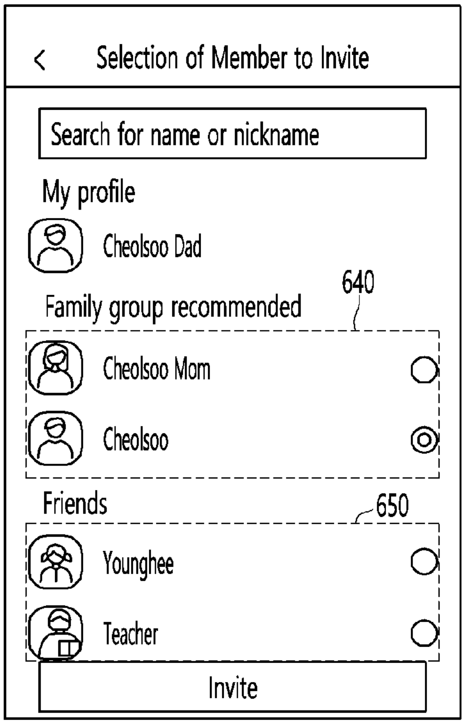

FIGS. 6A-6C shows an exemplary screen of the first user terminal 20 in the process of performing operation S130.

As shown in FIG. 6A, the first user terminal 20 may display an interface 610 for inviting other users to the group. The first user may perform a procedure of inviting other users to the group by inputting an interaction on the interface 610.

As shown in FIG. 6B, a profile of the first user to be used when inviting other users to the group may be displayed on the first user terminal 20. In this case, the first user may change his or her own profile to be shown to other users when inviting other users to the group.

As shown in FIG. 6C, the first user terminal 20 may display a list of friends to be invited to the group among friends of the first user in the messenger service. As shown in FIG. 6C, the first user may invite only a user selected from among the friends of the first user to the group in the messenger service. If the first user wishes to invite a user who is not his or her messenger service friend to the group, the first user must first form a friend relationship with the corresponding user and invite the corresponding user to the group.

As shown in FIG. 6C, candidate friends determined to be appropriate for the first user to invite to the group may be displayed as a separate list 640 on the first user terminal 20. In addition, general friends of the first user may be displayed as another separate list 650.

The candidate friends are friends selected by the server 10 from among the friends of the first user in the messenger service as being appropriate for the first user to invite to the group. The candidate friends may be based on each friend's profile name or conversation contents with the first user's each friend in the messenger service. For example, as shown in FIG. 6C, when the profile name of the first user is "Cheolsoo Dad", a friend with a profile of "Cheolsoo Mom" and a friend with a profile of "Cheolsoo" are highly likely to be family members of the first user, and thus, these friends may be selected as candidate friends. If titles such as "mom", "dad", "son", and "daughter" frequently appear in conversation between the first user and a friend of the first user, and the conversation content is likely to be a family relationship, there is a high possibility of a family relationship based on the content of the conversation and the corresponding friend may be selected as a candidate friend.

In some cases, favorite friends designated by the first user, other than candidate friends, may be displayed as a separate list on the first user terminal 20. If both candidate friends and favorite friends are displayed, the order in which the friends are displayed may be changed in any of various ways.

Figure 7A:
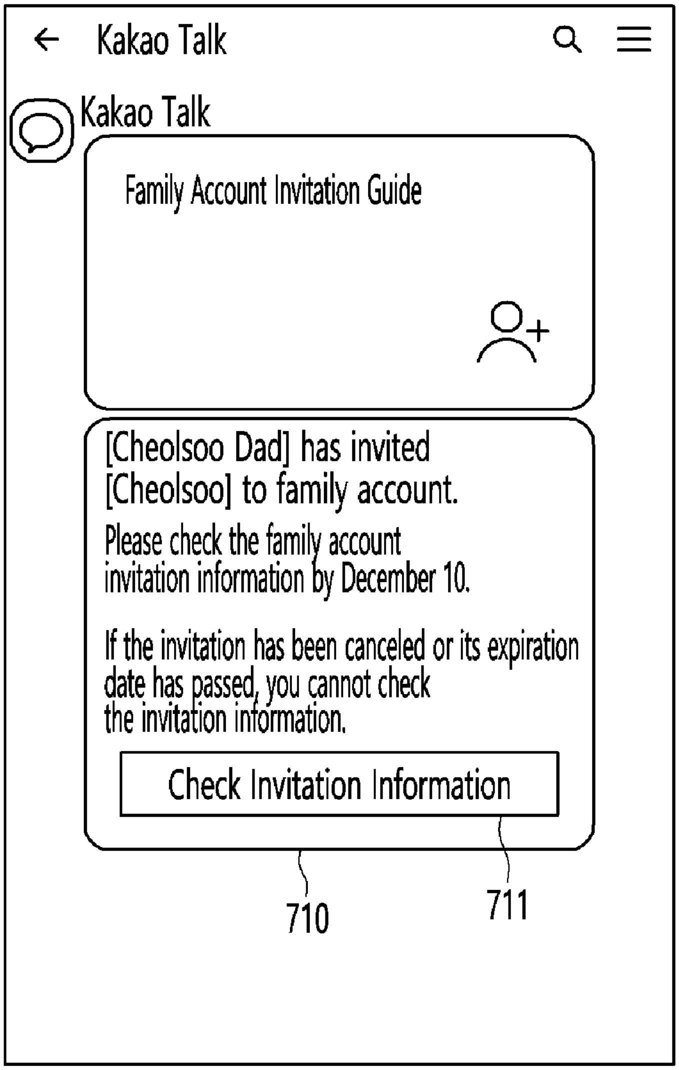
Figure 7B:
Figure 7C:
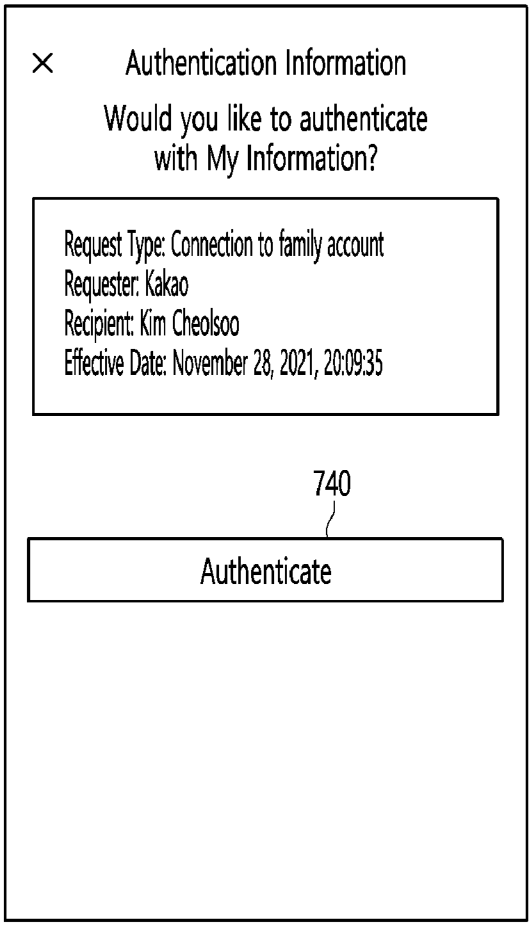

FIGS. 7A-7C shows an exemplary screen of the second user terminal 30 in the process of performing operations S140, S150, S160, and S170.

As shown in FIG. 7A, an invitation message 710 indicating that the first user has invited the second user to a group may be displayed on the second user terminal 30. This invitation message 710 is displayed in the form of a messenger service message. As shown in FIG. 7A, the invitation message may be sent in the form sent by the operator of the messenger service, but may also be sent in the form sent by the first user in some cases. The invitation message 710 may include an interface 711 for checking invitation information.

As shown in FIG. 7B, a page for checking invitation information may be displayed on the second user terminal 30. The page for checking the invitation message may include profile information 720 of the first user who has requested the invitation. In addition, the invitation message 710 may include an interface 730 for accepting the invitation. The second user may accept the invitation by entering an interaction on the interface 730.

As shown in FIG. 7C, a screen for completing authentication, which is the eligibility to join a group, may be displayed on the second user terminal 30. The second user may perform authentication by inputting an interaction for the interface 740 displayed on the screen.

FIGS. 8A-8D shows exemplary screens of the first user terminal 20 and the second user terminal 30 in the process of performing operations S174, S175, S200, and S210.

Figure 8A:
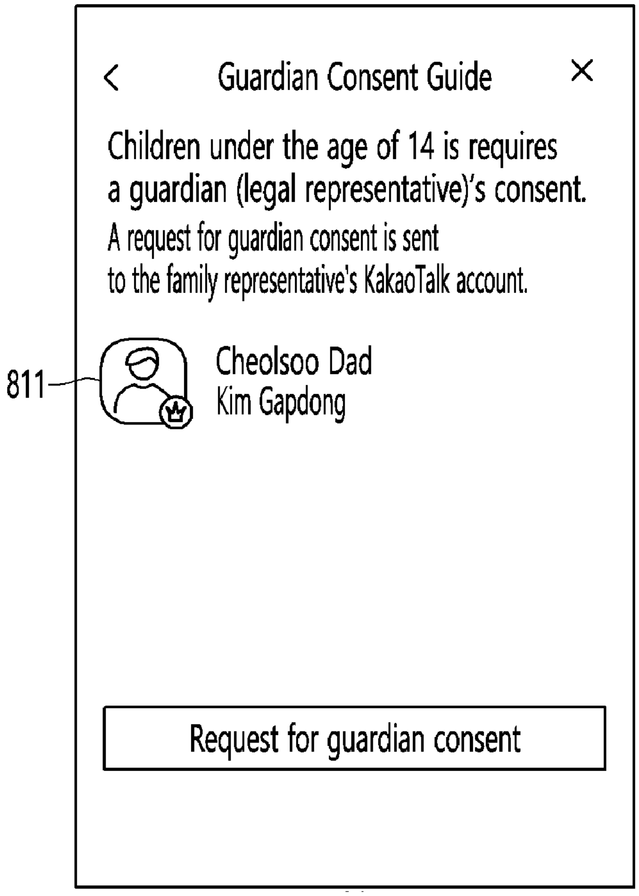

FIG. 8A is a screen of the second user terminal 30. The second user terminal 30 may display an interface 810 requesting guardian consent from the first user 811, who is a family representative.

If FIG. 8A corresponds to operation S174, a first user 811 may be the representative of a family account group and invite a second user to the group. If FIG. 8A corresponds to operation S200, the first user 811 may be selected from among users with at least one user with guardianship included in the group in the previous operation S190.

Figure 8B:

When the second user requests guardian consent on the screen of FIG. 8A, the screen of the second user terminal 30 may display as shown on FIG. 8B. If authentication is completed in the first user terminal 20 while the screen of the second user terminal 30 as shown in FIG. 8B, a "Confirm" interface 820 may be activated on the screen of the second user terminal 30 as shown in FIG. 8B or the screen as shown in FIG. 8B may be automatically terminated.

Figure 8C:
Figure 8D:
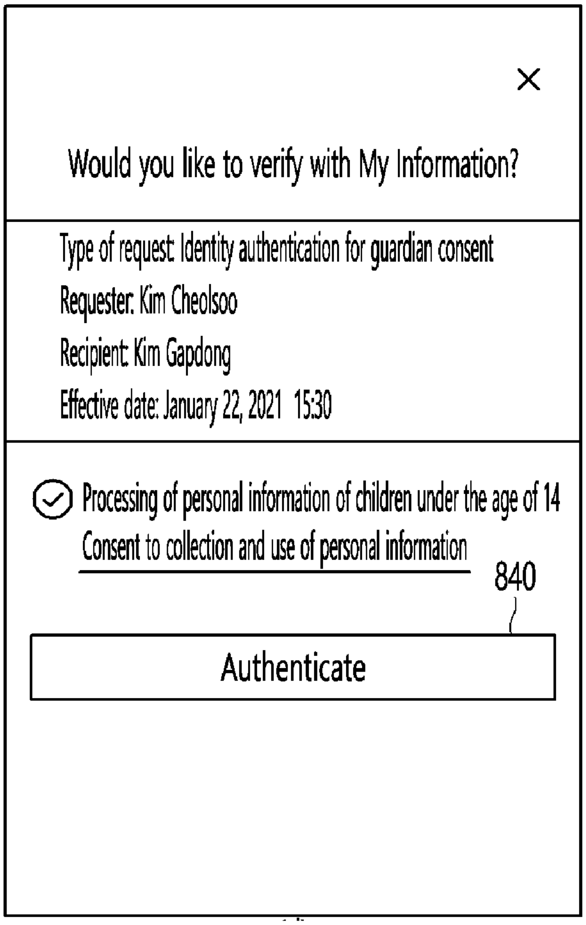

FIG. 8C and FIG. 8D are screens of the first user terminal 20. As shown in FIG. 8C, a request message 830 requesting guardian consent as a guardian of the second user through the messenger service may be displayed on the first user terminal 20. As shown in FIG. 8C, the request message 830 may be transmitted in the form sent by a messenger service operator, but may also be transmitted in the form sent by a second user in some cases.

The request message 830 may display a subject of consent for which guardian consent is requested. The subjects to consent may include a request type, a requester, a recipient, an effective date, etc. In addition, the request message 830 may include an interface for accepting guardian consent. The first user may accept guardian consent by inputting an interaction on the interface.

As shown in FIG. 8D, a screen for completing guardian consent may be displayed on the first user terminal 20. The first user may perform authentication to complete guardian consent by inputting an interaction on the interface 840 displayed on the screen. Here, the authentication for completing guardian consent may be the same certificate authentication as the certificate for creating a group in operation S120. Accordingly, since the first user authenticates an already issued certificate through the messenger service he or her usually uses, the first user may be able to easily perform the authentication.

Figure 9A:
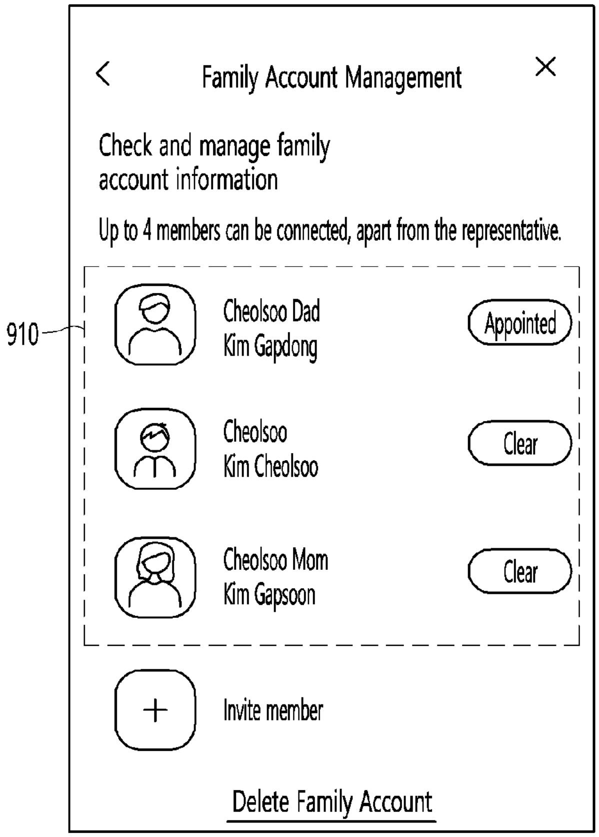
Figure 9B:
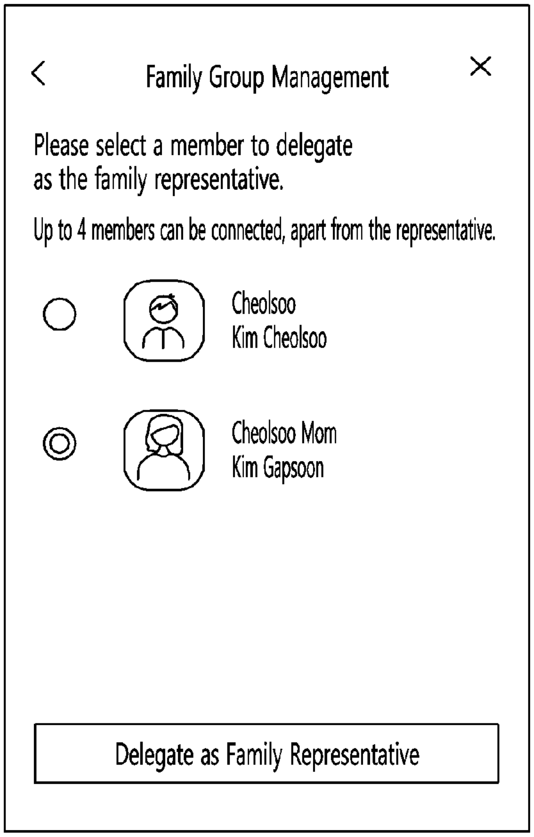

FIGS. 9A-9B illustrates an exemplary screen of the first user terminal 20 in the process of managing a group and changing a family representative.

As shown in FIG. 9A, the current status of users managed in the same group in the messenger service may be displayed on the first user terminal 20. Specifically, the users in the same group may be displayed on a list 910. The first user may add or delete a group member through a screen shown in FIG. 9A.

As shown in FIG. 9B, an interface for changing (delegating) a family representative to a user of another group may be displayed on the first user terminal 20. Using the interface, the first user may change (delegate) the family representative to another user. Upon receiving a request to change (delegate) the family representative through the above process, the server 10 may change the family representative after confirming the eligibility of the family representative of the user to be changed (delegated). Here, the eligibility of the family representative may be the same as the eligibility to create a group.

Figure 10:
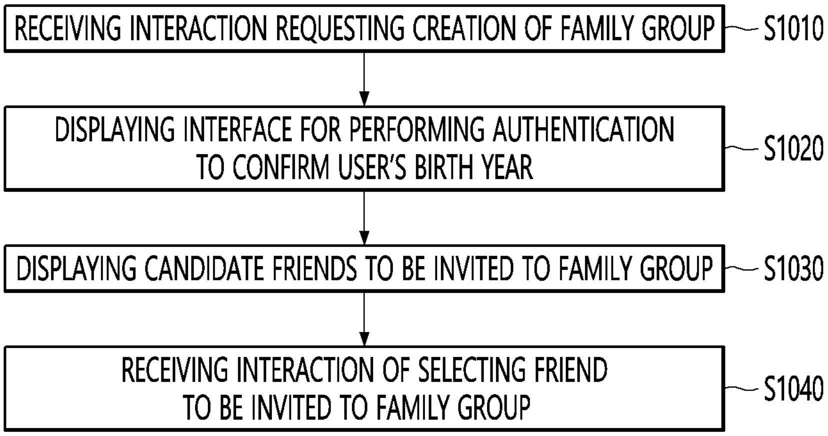
FIG. 10 is a flowchart illustrating a method for a user terminal to group and manage messenger service users according to an embodiment of the present disclosure.

Hereinafter, a method for managing messenger service users in a group by a user terminal according to the present disclosure will be described with reference to FIG. 10. For convenience of explanation, some description redundant with the above description will be omitted. A user terminal described with reference to FIG. 10 corresponds to the first user terminal 20 described above.

In operation S1010, the user terminal receives an interaction requesting creation of a group. An interface 510 through which the user terminal can request group creation may be shown in FIG. 5A. In operation S1010, the user terminal may receive an input of an interaction on the interface 510.

In operation S1020, the user terminal displays an interface for performing authentication to confirm the user's year of birth. Displaying the interface may be entered through the interface 521 shown in FIG. 5B.

In operation S1030, the user terminal displays candidate friends that the user can invite to a group. In operation S1040, the user terminal receives an interaction for selecting a friend to be invited to the group from among candidate friends. Displaying the candidate friends and receiving an interaction for selecting a friend to be invited to the group from among the candidate friends are shown in FIG. 6C.

In the present disclosure, it is possible to group and manage messenger service users according to predetermined criterion and procedure in a simple way.

In addition, it is possible to improve user convenience by using messages of the messenger service in grouping and managing messenger service users.

In addition, it is possible to improve convenience of requesting and executing guardian consent between users by grouping and managing messenger service users.

The technical features disclosed in each embodiment of the present disclosure are not limited to a corresponding embodiment, and unless incompatible with each other, the technical features disclosed in each embodiment may be applied in combination to other embodiments.<

Therefore, although each embodiment is described mainly about an individual technical feature, the technical features of the embodiments of the present disclosure may be applied in combination, unless incompatible with each other.

The present disclosure is not limited to the above-described embodiments and the accompanying drawings, and various modifications and changes may be made in view of a person skilled in the art to which the present disclosure pertains. Therefore, the scope of the present disclosure should be determined by the scope of the appended claims, and equivalents thereof.

What is claimed is:

1. A method for grouping and managing messenger service users performed by a server, the method comprising:
- receiving, from a first user, a request to create a group;
- determining whether the first user is eligible to create the group;
- receiving a request from the first user to invite a second user to the group, wherein the second user corresponds to a friend of the first user in a messenger service operated by the server;
- sending an invitation message to invite the second user to the group through the messenger service;
- receiving a response indicating acceptance of the invitation from the second user;
- determining whether the second user is eligible to join the group;
- providing, to a second user terminal of the second user, interface information for obtaining eligibility to join the group;
- managing the first user and the second user in the group;
- providing, to a first user terminal of the first user, group management interface information for displaying a current status of users in the group and for receiving an interaction to change a representative of the group;
- receiving, via the group management interface information, from the first user, a request to change the representative of the group from the first user to a target user in the group;
- in response to receiving the request, determining whether the target user is eligible to be the representative of the group; and
- changing the representative of the group to the target user based on determining that the target user is eligible to be the representative of the group, wherein eligibility to be the representative of the group is the same as eligibility to create the group,
- wherein the first user is determined to be eligible to create the group based on whether the first user satisfies a predetermined first age criterion,
- wherein the interface information provided to the second user terminal differs depending on whether the second user satisfies a predetermined second age criterion, such that an approval interaction is conditionally required in response to a result of determining whether the second user satisfies the predetermined second age criterion, and
- wherein the first age criterion and the second age criterion are different from each other.

2. The method of claim 1, wherein the eligibility to create the group is that the first user completes authentication through an authentication method for authenticating the birth year of the first user.

3. The method of claim 1, wherein the eligibility to create the group is that the birth year of the first user is earlier than an age predetermined criterion.

4. The method of claim 1, wherein the eligibility to join the group is that the second user has completed authentication through an authentication method for confirming the birth year of the second user.

5. The method of claim 1, further comprising:
- receiving, by the server, from the second user, request information requesting guardian consent from the first user; and
- transmitting, by the server, a request message requesting the guardian consent to the first user through the messenger service.

6. The method of claim 5, wherein the receiving of the request information and the transmitting of the request message are performed after the managing of the first user and the second user in the group.

7. The method of claim 5, wherein:
- the guardian consent is required for the second user to obtain the eligibility to join the group, and
- the receiving of the request information and the transmitting of the request message are performed between the sending of the invitation message and the managing of the first user and the second user in the group.

8. The method of claim 1, further comprising:
- receiving, by the server, from the second user, information requesting guardian consent to at least one user selected by the second user from among users managed in the group; and
- transmitting, by the server, a request message to request the guardian consent to the at least one user through the messenger service.

9. The method of claim 1, further comprising:
- selecting, by the server, from among friends of the first user in the messenger service, a candidate friend to be invited to the group according to another predetermined criterion, and providing the selected candidate friend.

10. The method of claim 9, wherein the another predetermined criterion is based on a profile name of a friend of the first user or content of a conversation with the friend of the first user in the messenger service.

11. The method of claim 1, wherein the invitation message comprises an interface for accepting the invitation.

12. The method of claim 1, further comprising:
- providing the second user with an interface capable of obtaining the subscription credential when it is determined that the first user is not eligible to join the group.

13. A server for grouping and managing messenger service users, the server comprising:
- a memory; and
- a processor connected to the memory and configured to execute instructions stored in the memory,
- wherein the processor is further configured to:
  - receive a request to create a group from a first user;
  - determine whether the first user is eligible to create the group;
  - receive a request from the first user to invite a second user to the group, wherein the second user corresponds to a friend of the first user in a messenger service operated by the processor;
  - send, through the messenger service, an invitation message to invite the second user to the group;
  - receive, from the second user, a response indicating that the invitation is accepted;
  - determine whether the second user is eligible to join the group;
  - provide, to a second user terminal of the second user, interface information for obtaining eligibility to join the group; and
  - manage the first user and the second user in the group,
  - provide, to a first user terminal of the first user, group management interface information for displaying a current status of users in the group and for receiving an interaction to change a representative of the group;

receive, via the group management interface information, from the first user, a request to change the representative of the group from the first user to a target user in the group;

in response to receiving the request, determine whether the target user is eligible to be the representative of the group; and change the representative of the group to the target user based on determining that the target user is eligible to be the representative of the group, wherein eligibility to be the representative of the group is the same as eligibility to create the group, wherein the first user is determined to be eligible to create the group based on whether the first user satisfies a predetermined first age criterion, wherein the interface provided to the second user differs depending on whether the second user satisfies a predetermined second age criterion, and wherein the first age criterion and the second age criterion are different from each other.

14. A method for a user terminal to group and manage users of a messenger service, the method comprising:

receiving an interaction requesting creation of a group of users, which is a subset of the users of the messenger service;

displaying an interface for performing authentication to confirm a user's year of birth;

displaying candidate friends allowed for the user to invite to the group, wherein the candidate friends are at least a part of friends of the messenger service to which the user has joined, and wherein the user is the group creator and a representative of the group;

receiving a friend interaction for selecting a friend to be invited to the group from among the candidate friends;

displaying a group management interface configured to display a current status of the users in the group;

receiving, via the group management interface, an interaction requesting to change the representative of the group to a target user in the group;

transmitting, to a server, a request to change the representative of the group to the target user; and displaying completion of the change of the representative of the group based on a determination by the server that the target user is eligible, wherein the eligibility to become the representative of the group is the same as the eligibility to create the group, wherein the user is determined to be eligible to create the group based on whether the user satisfies a predetermined first age criterion, wherein the friend is determined to be eligible to join the group based on whether the friend satisfies a predetermined second age criterion, and wherein the first age criterion and the second age criterion are different from each other.

15. The method of claim 14, further comprising:

displaying, by the user terminal, a message requesting guardian consent to the user via the messenger service and an interface through which the user is able to perform the guardian consent, wherein the message comprises content that the friend managed in the group requests the user to consent to consent as a guardian of the friend.

16. The method of claim 15, further comprising:

displaying, by the user terminal, a subject of the guardian consent; and displaying, by the user terminal, an interface for performing authentication for the guardian consent.

* * * * *